United States Patent [19]
McKinney

[11] Patent Number: 5,853,512
[45] Date of Patent: Dec. 29, 1998

[54] METHOD OF MANUFACTURING UNITARY FRAMED FOAM PANELS

[75] Inventor: Matthew M. McKinney, Somerville, Ala.

[73] Assignee: EFP Corporation, Decatur, Ala.

[21] Appl. No.: 804,391

[22] Filed: Feb. 21, 1997

[51] Int. Cl.[6] .............................. B29C 67/20; E04C 1/00
[52] U.S. Cl. ................... 156/78; 52/309.4; 52/309.7; 264/46.4; 264/46.7
[58] Field of Search .............................. 156/78; 264/45.4, 264/46.4, 46.7; 52/309.4, 309.7

[56] References Cited

U.S. PATENT DOCUMENTS

| | | | |
|---|---|---|---|
| 3,776,523 | 12/1973 | Weiland | 29/522.1 |
| 4,223,500 | 9/1980 | Clark | 52/309.7 |
| 4,284,447 | 8/1981 | Dickens | 156/78 |
| 4,641,468 | 2/1987 | Slater | 52/309.7 |
| 4,653,718 | 3/1987 | Dickens | 264/46.7 |
| 5,401,456 | 3/1995 | Alesi | 156/245 |
| 5,520,765 | 5/1996 | Zoller | 156/245 |
| 5,524,400 | 6/1996 | Schmechel | 52/309.7 |

*Primary Examiner*—Daniel Stemmer
*Attorney, Agent, or Firm*—John C. Garvin, Jr.; James E. Staudt

[57] ABSTRACT

A method and apparatus for fabrication of unitary foam panels wherein frames members are fabricated by forming metal stock into a crossectional channel configuration, cutting and swedging the channel into predetermined lengths. The frame members are swedged to provide frictional interconnection at the corners thereof upon assembly of said frame members into a rectangular frame configuration. Assembly of the frame is accomplished in a shuttle having two assembly jigs. Upon assembly, each frame is moved by the shuttle into a molding press wherein a panel of foam is molded within the frame. The shuttle moves back and forth through the molding press in a manner which provides for removal of a completed panel and assembly of an additional frame from one jig of the shuttle while the molding operation is accomplished within the molding press upon a frame retained within the other jig of the shuttle.

6 Claims, 7 Drawing Sheets

```
┌─────────────────────────────────────────────────────────────────────┐
│ PROVIDE CHANNEL SHAPED FRAME MEMBERS OF PREDETERMINED LENGTHS,      │
│ EACH FRAME MEMBER HAVING A SWEDGED END PORTION AT ONE END AND A     │
│ STRAIGHT END PORTION AT THE OPPOSITE END THEREOF AND HAVING INNER   │
│ AND OUTER SURFACES.                                                 │
└─────────────────────────────────────────────────────────────────────┘
                                  ↓
┌─────────────────────────────────────────────────────────────────────┐
│ COAT INNER SURFACES OF EACH FRAME MEMBER WITH HEAT ACTIVATED        │
│ GLUE.                                                               │
└─────────────────────────────────────────────────────────────────────┘
                                  ↓
┌─────────────────────────────────────────────────────────────────────┐
│ ASSEMBLE SAID FRAME MEMBERS INTO A RECTANGULAR FRAME BY FITTING A   │
│ SWEDGED END PORTION OF EACH FRAME MEMBER INTO A STRAIGHT END        │
│ PORTION OF ANOTHER FRAME MEMBER.                                    │
└─────────────────────────────────────────────────────────────────────┘
                                  ↓
┌─────────────────────────────────────────────────────────────────────┐
│ PLACE SAID ASSEMBLED FRAME IN A FOAM MOLDING PRESS.                 │
└─────────────────────────────────────────────────────────────────────┘
                                  ↓
┌─────────────────────────────────────────────────────────────────────┐
│ FILL SAID ASSEMBLED FRAME WITH FOAM MATERIAL.                       │
└─────────────────────────────────────────────────────────────────────┘
                                  ↓
┌─────────────────────────────────────────────────────────────────────┐
│ MOLD SAID FOAM WITHIN SAID FRAME BY THE INTRODUCTION OF             │
│ PRESSURIZED, HIGH TEMPERATURE STEAM INTO SAID FOAM MOLDING PRESS.   │
└─────────────────────────────────────────────────────────────────────┘
                                  ↓
┌─────────────────────────────────────────────────────────────────────┐
│ REMOVE THE MOLDED PANEL FROM SAID MOLDING PRESS.                    │
└─────────────────────────────────────────────────────────────────────┘
                                  ↓
┌─────────────────────────────────────────────────────────────────────┐
│ CONTROL THE COOLING OF SAID MOLDED PANEL SO AS TO PREVENT           │
│ WARPING OF THE PANEL.                                               │
└─────────────────────────────────────────────────────────────────────┘
```

Fig. 13

PROVIDE CHANNEL SHAPED FRAME MEMBERS OF PREDETERMINED LENGTHS, EACH HAVING A SWEDGED END PORTION AT ONE END AND A STRAIGHT END PORTION AT THE OPPOSITE END, AND HAVING AN INNER AND OUTER SURFACE 18 AND 20 RESPECTIVELY (FIG. 1), THE INNER SURFACE OF WHICH IS PROVIDED WITH A COATING OF HEAT ACTIVATED GLUE THEREON.

↓

IN WORKSTATION "A" -- (WITH SHUTTLE 50 IN A "LEFT" POSITION) ASSEMBLE FRAME MEMBERS 30 AND 32 INTO A RECTANGULAR FRAME 34 WITHIN JIG SECTION 52 OF SHUTTLE 50 BY INSERTING A SWEDGED END PORTION OF EACH FRAME MEMBER INTO A STRAIGHT END PORTION OF AN ADJACENT FRAME MEMBER. AND FRICTIONALLY POSITION REINFORCEMENT INSERTS 40 AND 42 INTO SELECTED POSITIONS WITHIN THE CHANNELS OF FRAME MEMBERS 30 AND 32. (FIG. 9).

↓

MOVE SHUTTLE 50 TO ITS "RIGHT" POSITION TO TRANSFER JIG SECTION 52 FROM STATION "A" TO STATION "B", AS JIG SECTION 54 MOVES TO STATION "C" (FIG. 10).

↓

PERFORM MOLDING OPERATION IN MOLDING PRESS 60 (STATION "B") -- WHILE MOLDING OPERATION IS IN PROGRESS IN STATION "B" THE FOLLOWING OPERATIONS ARE PERFORMED IN WORKSTATION "C"; (1) REMOVE COMPLETED UNITARY FRAMED FOAM PANEL 70C FROM JIG SECTION 54, (2) PLACE COMPLETED PANEL 70C IN COOLING RACK 90 (FIG. 12), (3) ASSEMBLE FRAME MEMBERS 30 32 INTO A RECTANGULAR FRAME 34 WITHIN JIG SECTION 54 OF SHUTTLE 50 BY INSERTING A SWEDGED END OF EACH FRAME MEMBER INTO A STRAIGHT END PORTION OF AN ADJACENT FRAME MEMBER. AND FRICTIONALLY POSITION REINFORCEMENT INSERTS 40 AND 42 INTO SELECTED POSITIONS WITHIN THE CHANNELS OF FRAME MEMBERS 30 AND 32. (FIG. 10)

↓

MOVE SHUTTLE 50 TO ITS "LEFT" POSITION TO TRANSFER JIG SECTION 54 FROM STATION "C" BACK INTO MOLDING PRESS 60 (STATION "B") AS JIG SECTION 52 MOVES BACK INTO WORK SECTION "A".

↓

PERFORM MOLDING OPERATION IN MOLDING PRESS 60 (STATION "B") -- WHILE MOLDING OPERATION IS IN PROGRESS IN STATION "B" THE FOLLOWING OPERATIONS ARE PERFORMED IN WORKSTATION "A"; (1) REMOVE COMPLETED UNITARY FRAMED FOAM PANEL 70C FROM JIG SECTION 52, (2) PLACE COMPLETED PANEL 70C IN COOLING RACK 90 (FIG. 12) TO COMPLETE THE CYCLE.

Fig. 14

METHOD OF MANUFACTURING UNITARY FRAMED FOAM PANELS

TECHNICAL FIELD OF THE INVENTION

This invention relates to a method of manufacturing unitary framed foam panels such as may be utilized as the foundation for the manufacture of doors as well as for other miscellaneous construction items such as insulated walls, floors or ceilings.

BACKGROUND OF THE INVENTION

In general the manufacture of reinforced foam panels is well known. For example, the use of formed polyurethane and expandable polystyrene as well as other foam compounds have been widely used, and have provided the basis for numerous patents. Molding devices and methods of molding such foams are also well known and have been the subjects of patents. Some of these devices and processes involve blowing foam pellets into a mold wherein steam is injected and pressure is applied. Examples of foam panels and methods of fabrication are found in the following U.S. Patents: U.S. Pat. No. 4,284,447; U.S. Pat. No. 4,094,110; U.S. Pat. No. 4,241,555; U.S. Pat. No. 4,653,718; U.S. Pat. No. 4,953,334; U.S. Pat. No. 4,144,296; U.S. Pat. No. 4,240,557.

SUMMARY OF THE INVENTION

The present invention relates to the method of manufacturing unitary framed foam panels. The panels utilize a surrounding channel shaped frame. This frame is designed to receive reinforcement inserts at stress points and features swedged frame members which join to produce panel corners of great strength when filled with a molded foam core during a unique assembly and molding process. The panel corners, the frame, and the foam core, combine to provide a unitary framed foam panel of exceptional rigidity having coplanar surfaces throughout which makes the panel particularly well suited for acceptance of laminated coverings of all types. The frame panels are particularly designed for rapid and economical assembly when employing the a unique method of fabrication which is the subject of this invention.

BRIEF DESCRIPTION OF THE DRAWINGS

FIG. 14 is a sequential block diagram setting forth in detail the method of manufacturing the unitary framed foam panels.

DETAILED DESCRIPTION OF THE INVENTION

Figure 1:
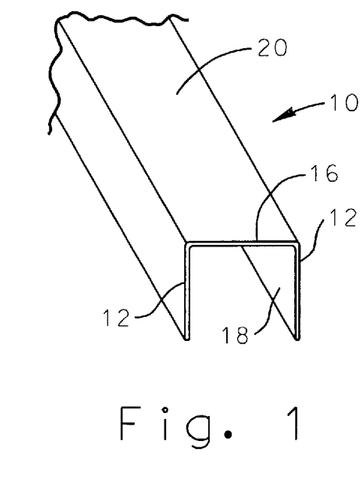
FIG. 1 is a perspective view of a broken away portion of channel shaped frame stock from which the framed foam panels are manufactured in accordance with the present invention.
Figure 2:
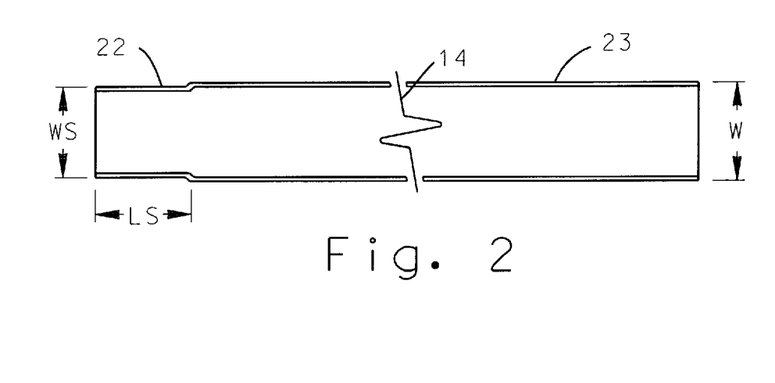
FIG. 2 is a top view of broken away portions of a length of channel stock as illustrated in FIG. 1 which has been cut to a predetermined length and swedged at one end thereof to form a frame member.
Figures 3, 4:
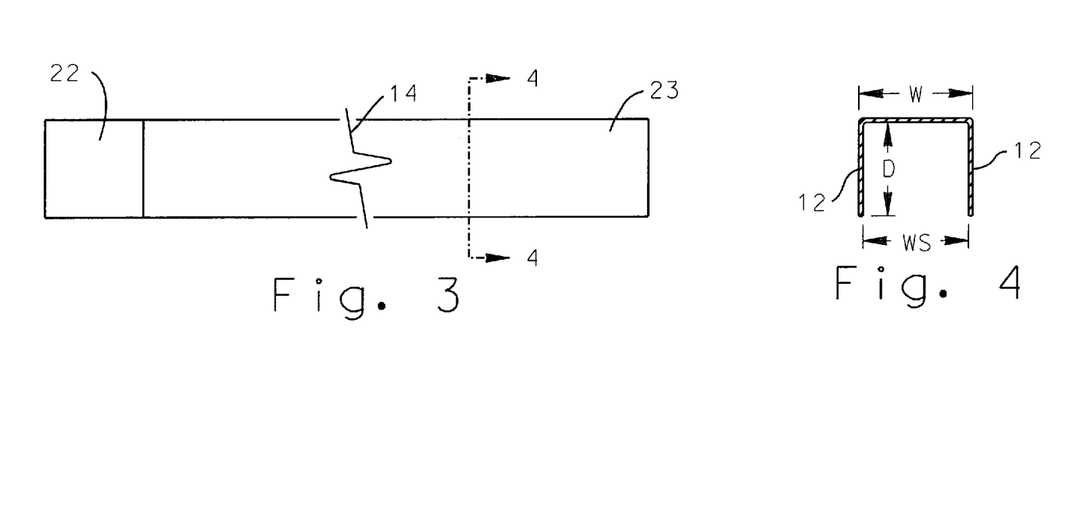
FIG. 3 is a front elevational view of the frame member as illustrated in FIG. 2.
FIG. 4 is a vertical sectional view of the frame member as illustrated in FIGS. 1–3 and taken in the plane 4—4 of FIG. 3.
Figure 5:
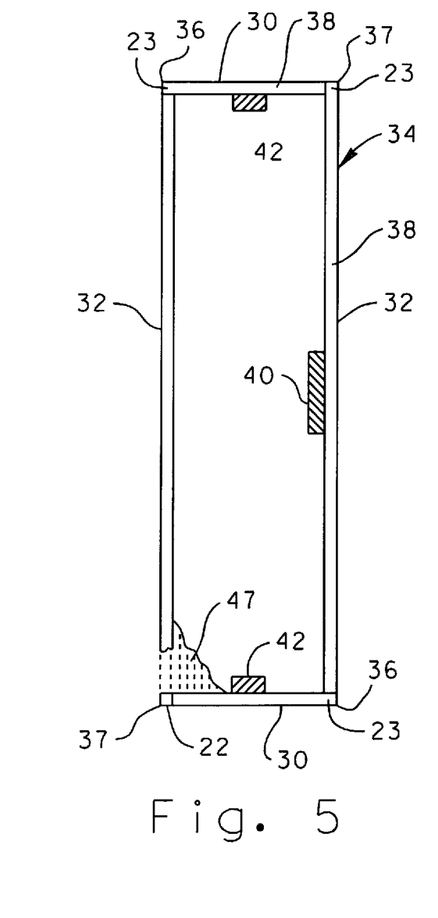
FIG. 5 is an elevation of an assembled frame configured from lengths of frame members as illustrated in FIGS. 2–4 and including reinforcement blocks and a cut away portion of a foam core in one corner thereof.
Figures 6, 7:
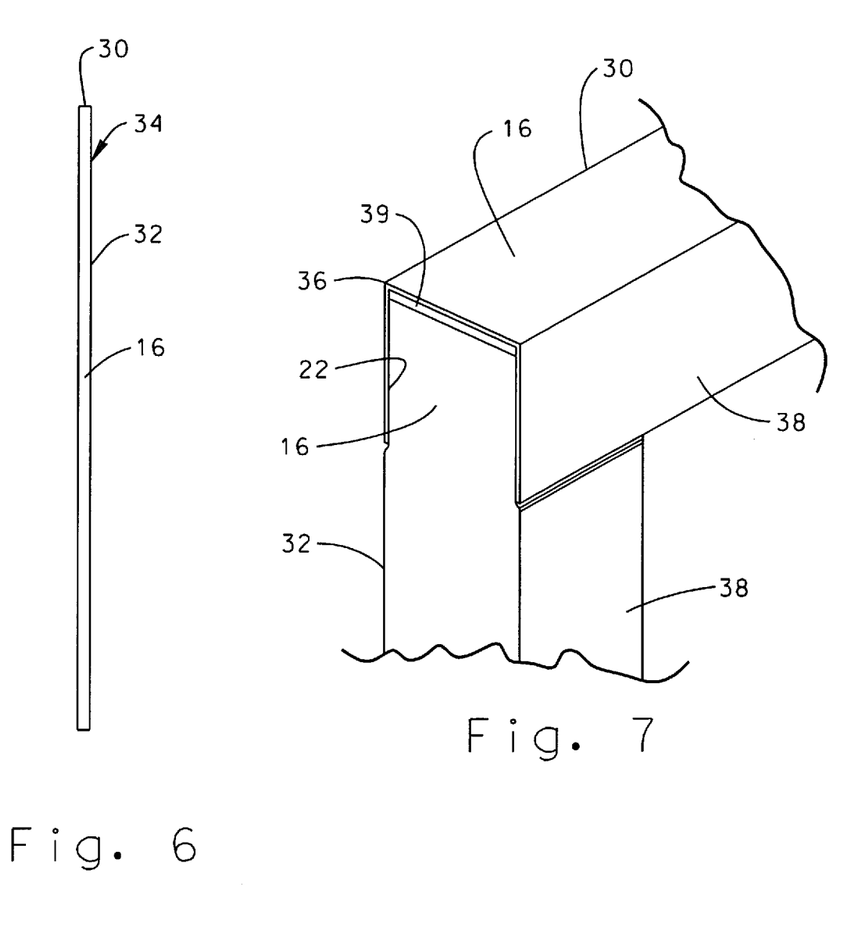
FIG. 6 is a side elevation of the frame of FIG. 5.
FIG. 7 is a cut away perspective view of a corner of the frame of FIGS. 5 and 6 as viewed from the outside of the frame.
Figure 8:
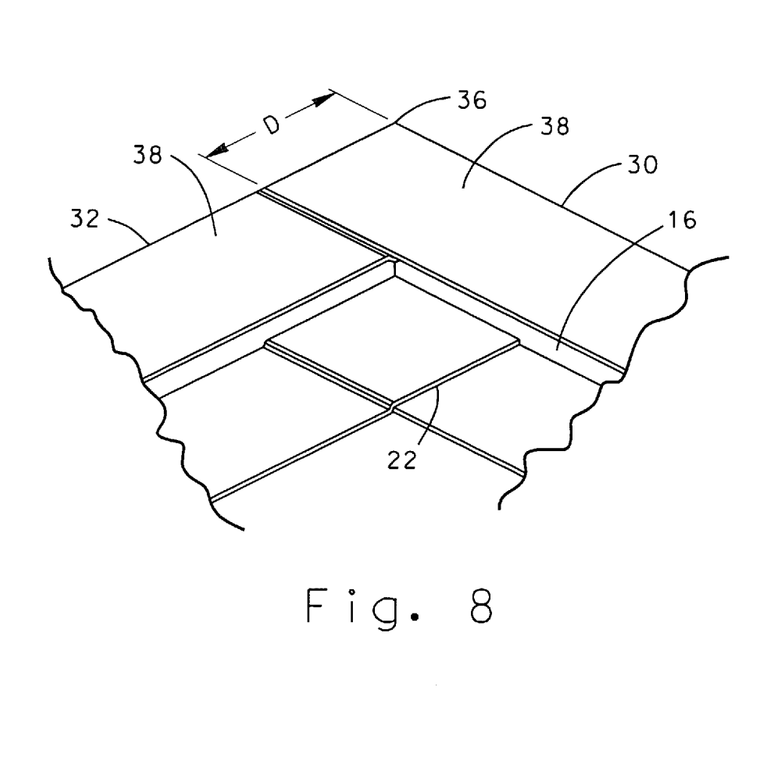
FIG. 8 is a cut away perspective view of a corner of the frame of FIGS. 5 and 6 as viewed from the inside of the frame.

Referring now to FIG. 1 of the drawings, a portion of metal frame stock 10 is illustrated. The frame stock 10 is configured as a channel having parallel legs 12 and a back portion 16 connecting the legs 12 to one another. As illustrated, the channel has an inside surface 18, an outside surface 20. The channel stock 10 is used to fabricate a metal frame which is the foundation of the unitary metal framed foam panel unit described supra. As best illustrated in FIG. 5, the frame stock is cut in two predetermined lengths so as to form pairs of end frame members 30 and pairs of longitudinal frame members 32, which when joined at the ends thereof form a rectangular frame 34. The frame members illustrated in FIGS. 2 and 3, have been cut to an appropriate length. As these frame members are illustrated as being broken away at 14, the drawings are appropriate illustrations of either the shorter frame members 30 or the longer frame members 32. Accordingly, it will be understood that the frame members 30 as well as the frame members 32 are swedged inwardly at one end thereof at the end portions 22 and also include a straight end portion 23 at the opposite ends thereof. As best illustrated in FIG. 2, the frame members are swedged an amount substantially equal to the thickness of the material from which the frame members are formed. As illustrated in FIG. 2, the length "LS" of the swedge is slightly shorter than the depth "D" (FIG. 4) of the legs 12 of the channel stock 10 to provide a vent 39 (FIG. 7) for expulsion of foam during a molding process, the details of which will be discussed hereinafter. To minimize the number of machine operations, a cutting tool (not shown) utilized for cutting the frame members 30, 32 from the channel stock 10 is combined with a swedging tool for forming the swedge portion 22. This allows the cutting and swedging of the channel stock 10 to be performed in a single operation. This provides each frame member 30,32 with a swedged portion 22 formed at one end thereof. Thus, in forming a rectangular frame 34 as illustrated in FIGS. 5 and 6, the swedged end portion of each frame member 30 will be inserted within a straight end portion 23 of each frame member 32 so as to form two diagonally opposed corners 36 of the frame 34. The other two corners 37 being formed in a similar fashion wherein the swedged end portion of each frame member 32 are inserted within the straight end portion 23 of each frame member 30. As illustrated in FIGS. 7 and 8 which show the details of the upper left corner of the rectangular frame 34, this swedging provides a unique arrangement wherein the outer faces 38 on either side of the door frame 34 align to form a substantially planar surface wherein no outward protrusions are present. This feature permits the addition of surface laminate materials to a completed panel unit having no such protrusions which would adversely effect the laminating process. It addition, this corner configuration provides a friction fit between the frame members 30 and 32 which provides added integrity to the frame 34 during the assembly thereof. That is to say, the friction fit of the corners aids in retaining the door frame in accurate alignment as it is assembled in a jig, as will be described hereinafter. Yet another feature of this corner configuration is the fact that while the corners have no protrusions, the swedged portions 22 provide a surface to surface contact with the inner surface of the end portions of the channel legs of an adjoining frame member. The advantages of this feature will become more apparent hereinafter wherein a gluing process will be described in which the inner surfaces of the frame members 30 and 32 are coated with a heat activated glue. It will be readily understood that the surface of the swedged end portions 22 will be firmly in contact with the glue coated inner surface of its adjoining frame member, thus providing an extremely rigid corner connection upon activation of the heat activated glue. It is pointed out that prior to assembly of the frame members, the heat activated glue is applied to the entire inner surface of each frame member. Thus, during the molding operation the heat which is applied serves not only in the molding process itself, but also activates the glue which upon activation provides a firm bond between the metal contacting surfaces of the frame as well as between the inner surfaces of the frame and the molded foam. As best illustrated in FIG. 7, another feature of the swedged corner configuration is that it permits an assembly procedure wherein a small vent 39 is provided to permit expulsion of excess foam which is added during the molding of foam within the confines of the frame 34. As will be seen in FIGS. 5, 9 and 10, reinforcement inserts such as 40 and 42 may be inserted into the channel of a frame member 30 and/or 32 to provide additional strength for any selected portion of the panel and thus provides a firm foundation for attachment of ancillary equipment to a completed panel. These inserts are typically preformed from a high strength foam or other suitable material, and are configured to provide a friction fit within the frame members so as to be held firmly in place by the legs 12 (FIG. 1) of the channel. The specific locations of the reinforcements 40 and 42 as illustrated are applicable to the use of the unitary framed foam panel as the foundation of a laminated door. In this example, the insert 40 provides a reinforced area to which a latching and locking mechanism will be installed. Similarly, reinforcement inserts 42 are provided for attachment of door closing mechanisms. As will be readily understood, such reinforcements may be utilized in a variety of sizes shapes and locations in application of the panels to uses other than the illustrated door panel example. As will be described in detail hereinafter, the frame 34 is assembled in a jig and the reinforcement inserts 40 and 42 are attached prior to a molding process during which the frame 34 is filled with a foam material 47 (FIG. 5).

Figure 9:
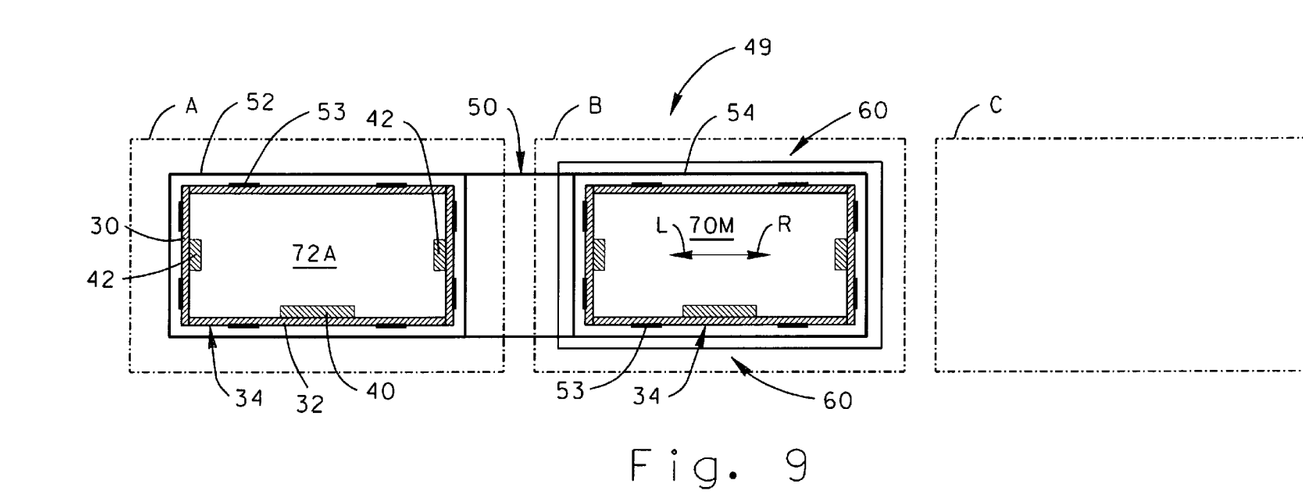
FIG. 9 is a diagrammatic illustration of a movable two section shuttle in a "left" position within hypothetical work stations illustrated by phantom lines, and a molding press which contains the right most shuttle section.
Figure 10:
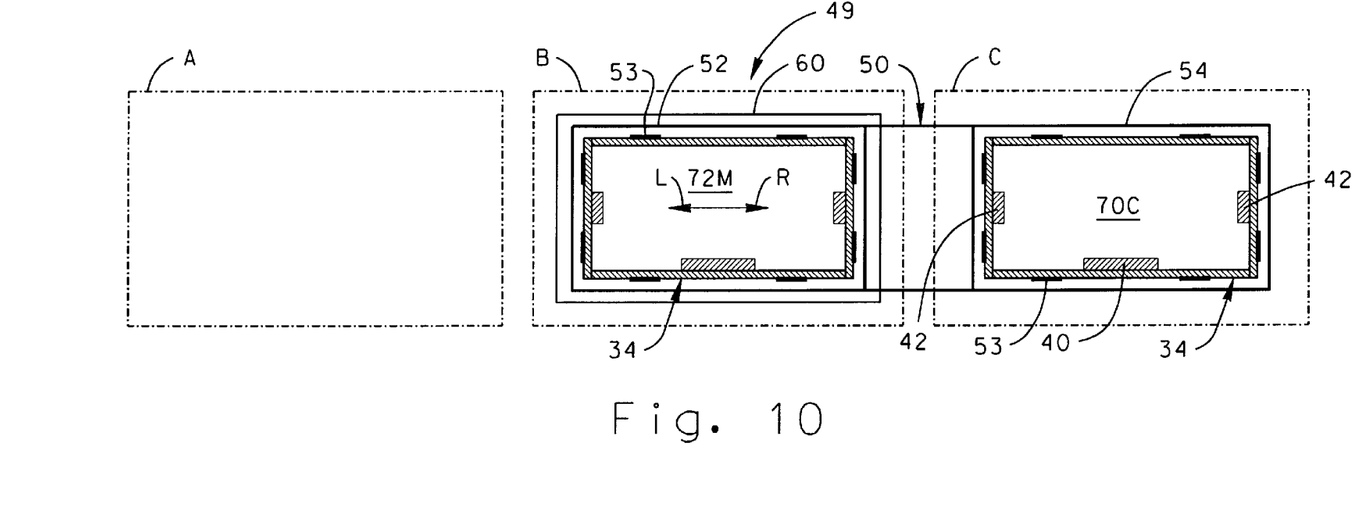
FIG. 10 is an illustration as in FIG. 9, but wherein the movable two section shuttle is illustrated in a "right" position.
Figure 11:
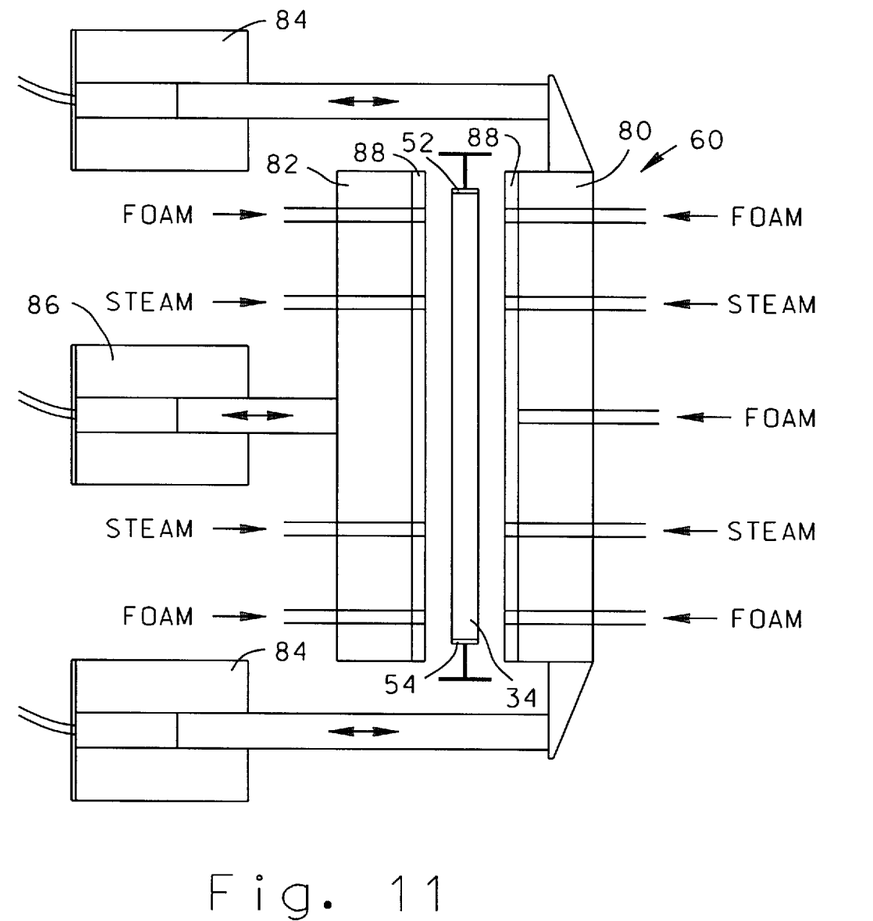
FIG. 11 is a diagrammatic illustration of the molding press as shown in FIGS. 9 and 10.

As illustrated schematically in FIGS. 9 and 10, except for the preparatory operation in the forming and glue coating of the frame members 30, 32, the method of fabricating the unitary framed foam panels are accomplished within a three station fabrication device 49. Within the fabrication device 49, stations delineated individually by phantom lines and designated as "A" and "C" are personnel work stations and a station designated as station "B" includes an automated foam molding press 60 positioned generally intermediate work stations "A" and "C". As illustrated diagrammatically in FIG. 11, foam is fed into the molding press 60 wherein it is molded into the metal frame 34 by the application of heat and pressure. During operation of the molding press, platens 88 are brought toward one another by hydraulic actuators 84 and 86 so as to contact each side of the frame 34. Foam is then fed in to firmly fill the frame 34. Steam is applied at a pressure of between 12 and 18 PSI, while temperatures of between 220 and 240 degrees Fahrenheit are attained. Water and vacuum and are utilized for partial cooling and stabilization of the panel prior to removal from the molding press. As illustrated in FIGS. 9 and 10, the fabrication device 49 also includes a shuttle 50 having two sections 52 and 54. The shuttle 50 automatically moves to the "right" and "left" through the molding press 60 so as to present one section to a work station for frame assembly while the other section is positioned in the molding press for molding the panels into a final configuration 70C (FIG. 10). The assembly of the metal frames 34 is accomplished within the jig sections 52 and 54. A plurality of magnetic retainers 53 are attached within the jig sections 54 to temporarily secure the individual frame members of the frame 34 during assembly within the jig sections. This arrangement facilitates the rapid assembly of the metal frame 34 in that the individual members of the frame are firmly retained in the jig upon contact with the magnets, while yet permitting sliding adjustments along the surface of the magnets during final positioning of the frame members within the jig. The schematic illustrations of the molding press show the molding press as being open to the viewer so as to illustrate the positions of the shuttle 50 as it assumes the positions it occupies during the molding operations. As indicated by the arrowheads "L" and "R" illustrated within the automated foam molding device the shuttle moves back and forth (left and right) within the molding device from the left position illustrated in FIG. 9 to the right position as illustrated in FIG. 10. Assuming the jig section 54 already includes an assembled frame 34 the sequence of operation begins with the shuttle in the "left" position. In the "left" position a frame 34 is assembled within jig section 52. Upon completion of the molding operation the shuttle automatically moves to the "right" position (FIG. 10). In the right position section 52 of the shuttle contains a panel 72M during the molding process wherein a frame 34 is being filled with foam which is molded by a heating and pressure process. It will be noted that the letters "A" "M" and "C", when following a numeral in the drawings, designates a panel in an Assembly stage, a Molding stage or a Completed stage respectively. In this ("right") position while the panel 72M within the molding press 60 is being filled with foam and molded, the panel 70C within section 54 has been completed and is ready for removal from the shuttle. Upon removal of the finished panel, an additional four piece metal frame 34 will be assembled within section 54 of the shuttle in preparation for movement to the next position (back to the "left"). Upon completion of the frame assembly in section 54 the shuttle is ready for movement back to the "left" position of the shuttle. Again the timing of movements of the shuttle 50 is predetermined and begins upon completion of the molding operation within the automated molding press 60. Upon completion of the molding process the shuttle will return to the "left" position as illustrated in FIG. 9 for removal of a completed panel in preparation for assembly of another frame 34 in the jig section 52. This completes one cycle of the fabrication mechanism.

Figure 12:
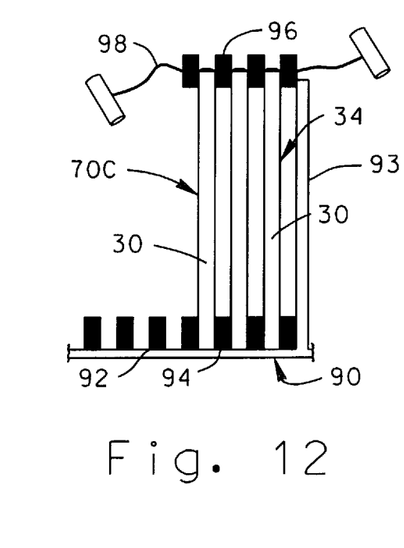
FIG. 12 is an elevational end view of a cooling stand having completed panels retained therein.

It is noted that upon removal of finished foam panels such as 70C from the molding press, the temperature of the panels is quite high. As the foam cools, it contracts. Accordingly, special care is required in the stacking of finished panels in that the panels must be arranged and supported in a parallel and equidistant spaced apart relationship to provide uniform cooling which is imperative to prevent warping which will occur if the cooling of the panels is not closely controlled. As illustrated in FIG. 12, a cooling rack 90 is provided for reception of the panels as they are removed from the shuttle 50. The cooling rack 90 includes a base 92 having upwardly extending spacer bars 94 for retaining and evenly spacing the completed panels during the controlled cooling thereof. A plurality of spacers 96 are attached to a line 98 so as to maintain a uniform spacing between the panels. The rack 90 as well as the spacers 96 is configured to maintain a spacing of one eighth to on quarter of an inch between the cooling panels. This spacing provides the controlled cooling of the hot panels which is necessary to prevent the panels from the warpage which would otherwise occur.

Figure 13:
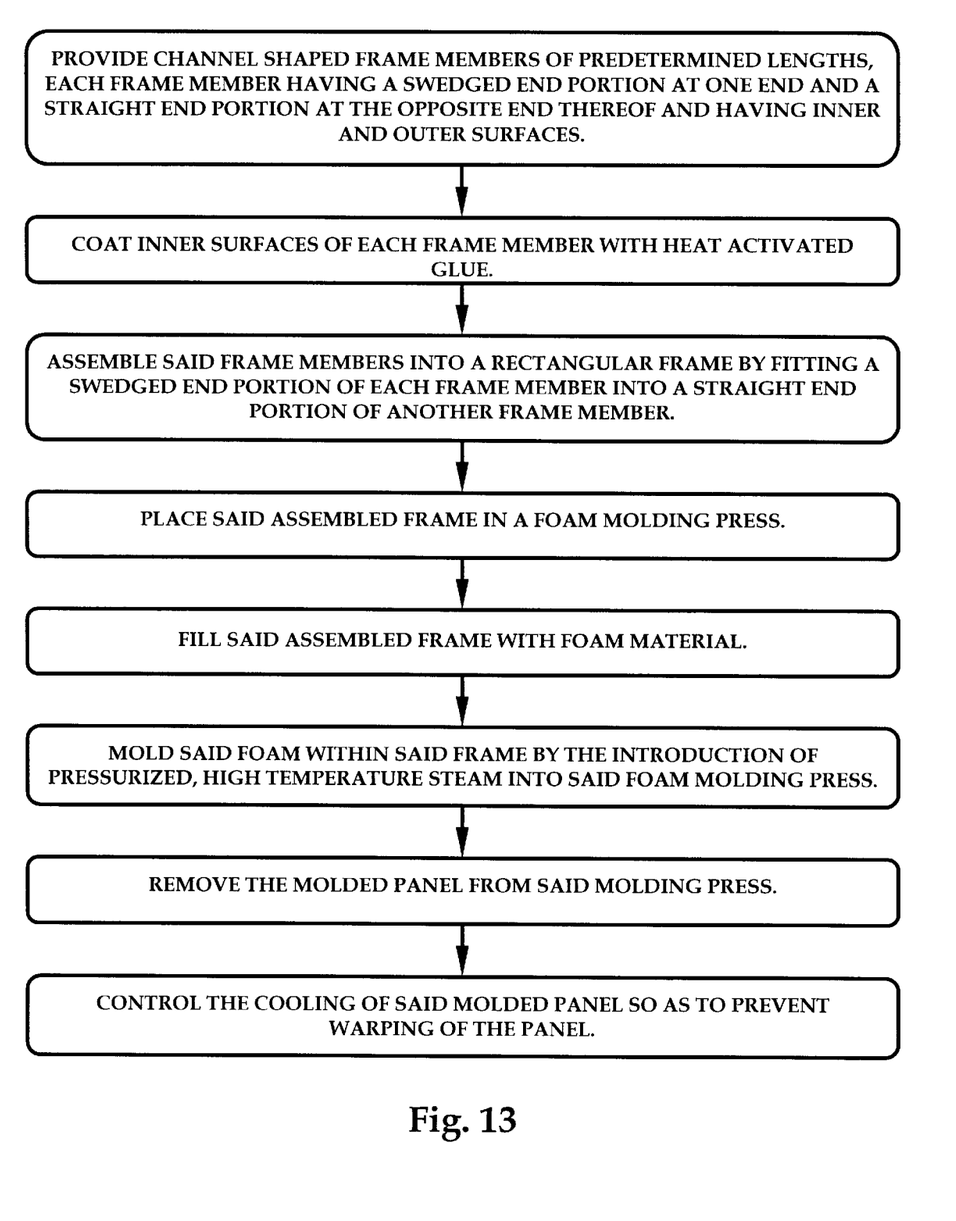
FIG. 13 is a block diagram illustrating basic sequential steps of manufacturing the unitary framed foam panels.

In performance of the method of fabrication of the unitary framed foam panels which is the subject of this invention, and which is best illustrated in FIG. 13, the following is the sequence of the basic steps involved therein.

(a) Provide channel shaped frame members of predetermined lengths each frame member having a swedged end portion at one end and a straight end portion at the opposite end thereof and having inner and outer surfaces.

(b) Coat inner surfaces of each frame member with heat activated glue.

(c) Assemble said frame members into a rectangular frame by fitting a swedged end portion of each frame member into a straight end portion of another frame member.

(d) Place said assembled frame in a foam molding press.

(e) Fill said assembled frame with foam material.

(f) Mold said foam within said frame by the introduction of pressurized, high temperature steam into said foam molding press.

(g) Remove the molded panel from said molding press.

(h) Control the cooling of said molded panel so as to prevent warping of the panel.

The following is a detailed description of the sequence of steps involved in the fabrication of the unitary framed foam panels wherein the steps are interrelated to the cooperation between the steps of fabrication and the fabrication device 49 as illustrated in FIGS. 9 and 10 To simplify the explanation of a full cycle of operation it is assumed that the shuttle 50 is in the "left" position and that the cycle begins with a completed frame 34 having been assembled in jig section 54 which is positioned in the molding process. These steps are reiterated in the flow chart as illustrated in FIG. 14.

(a) Provide channel shaped frame members of predetermined lengths, each having a swedged end portion at one end and a straight end portion at the opposite end, and having an inner and outer surface 18 and 20 respectively (FIG. 1), the inner surface of which is provided with a coating of heat activated glue thereon.

(b) In workstation "A"—(with shuttle 50 in a "left" position) assemble frame members 30 and 32 into a rectangular frame 34 within jig section 52 of shuttle 50 by inserting a swedged end portion of each frame member into a straight end portion of an adjacent frame member. And frictionally position reinforcement inserts 40 and 42 into selected positions within the channels of frame members 30 and 32. (FIG. 9).

(c) Move shuttle 50 to its "right" position to transfer jig section 52 from station "A" to station "B", as jig section 54 moves to station "C" (FIG. 10).

(d) Perform molding operation in molding press 60 (station "B")—while molding operation is in progress in station "B" the following operations are performed in workstation "C"; (1) remove completed unitary framed foam panel 70C from jig section 54, (2) place completed panel 70C in cooling rack 90 (FIG. 12), (3) assemble frame members 30 32 into a rectangular frame 34 within jig section 54 of shuttle 50 by inserting a swedged end of each frame member into a straight end portion of an adjacent frame member. And frictionally position reinforcement inserts 40 and 42 into selected positions within the channels of frame members 30 and 32. (FIG. 10).

(e) Move shuttle 50 to its "left" position to transfer jig section 54 from station "C" back into molding press 60 (station "B") as jig section 52 moves back into work section "A".

(f) Perform molding operation in molding press 60 (station "B")—while molding operation is in progress in station "B" the following operations are performed in workstation "A"; (1) remove completed unitary framed foam panel 70C from jig section 52, (2) place completed panel 70C in cooling rack 90 (FIG. 12) to complete the cycle.

It will be readily appreciated that the above described apparatus and the method of fabrication of these framed panels is exceedingly cost effective. In this regard, it is noted that during the time taken by the molding process (typically 100 seconds) the personnel in the work stations remain productively occupied by removing and stacking the finished and cooled panels, by assembly of the frame members in preparation for assembly and by retrieval and orderly arrangement of all assembly parts in preparation for the frame assembly process.

I claim:

1. A method of manufacturing unitary framed foam panels comprising the steps of:

(a) providing channel shaped frame members each having a swedged end portion and a straight end portion and cut to predetermined lengths suitable for forming a rectangle and having inner and outer surfaces thereon;

(b) coating the inner surfaces of each frame member with heat activated glue;

(c) assembling said frame members into a rectangular frame by fitting a swedged end portion of each frame member into a straight end portion of another frame member;

(d) placing said assembled frame in a foam molding press;

(e) filling said assembled frame with foam material;

(f) activating said heat activated glue and molding said foam within said frame by the introduction of pressurized, high temperature steam into said foam molding press so as to form a unitary framed foam panel;

(g) removing the molded panel from said molding press;

(h) cooling said molded panel in a controlled manner so as to prevent warping of the panel.

2. A method as set forth in claim 1 wherein said high temperature steam is introduced at a pressure of between 12 and 18 PSI, and at temperature of between 220 and 240 degrees Fahrenheit.

3. A method of fabricating framed foam panels from channel shaped frame members of predetermined lengths, each said channel having a swedged end portion, and a straight end portion said fabricating being accomplished primarily within a three station fabrication device having a first and third work station at either end thereof and a second station including a molding press intermediate the first and third work stations, and employing a two section shuttle for transporting the panels at various stages of completion into and out of the molding press, the method comprising the steps of:

(a) assembling the metal frame members into a rectangular frame by placing the swedged portion of each of said frame members into the straight end portion of another of said frame members within one section of the shuttle;

(b) moving said one section into the molding press;

(c) filling the molding press and the rectangular frame with expandable foam material;

(d) begin molding said foam material within said molding press to fill the channels of said metal frame while simultaneously assembling a second metal frame within the other section of said shuttle;

(e) completing molding of said foam material into a completed metal framed foam panel;

(f) moving said one section out of said molding press as said other section moves into said molding press;

(g) removing said completed metal framed foam panel from said one section of said shuttle;

(h) cooling each said completed metal framed foam panel in a controlled manner.

4. The method as set forth in claim 3, and further including the steps of stacking and supporting each said completed framed foam panel in equidistant spaced apart relationship with other completed panels so as to control said cooling.

5. The method as set forth in claim 4 wherein said panels are arranged in an equidistant spaced apart relationship of between one eighth and one quarter of one inch.

6. A method of fabricating framed foam panels from channel shaped frame members of predetermined lengths, each said channel having a swedged end portion and a straight end portion, said fabricating being accomplished primarily within a three station fabrication device having a first and third work station at either end thereof and a second station including a molding press intermediate the first and third work stations, and employing a shuttle having first and second jig sections for transporting the panels at various stages of completion into and out of the molding press, the method comprising the steps of:

(a) providing channel shaped frame members each having parallel legs and a back portion connecting said parallel legs and cut to predetermined lengths and having a swedged end portion and a straight end portion and an inner and outer surface, and wherein at least a first pair of said frame members are substantially equal in length and wherein at least a second pair of said frame members are substantially equal in length;

(b) applying a heat activated glue to the inner surface of each of said frame members;

(c) assembling a first and a second pair of frame members within the first of said first and second jig sections which jig sections are initially located in a first position, said frame members being arranged and retained in a rectangular assembled condition within said first jig section by magnets positioned within said jig sections and wherein during said assembling, the outer surfaces of the leg portions of said first pair of frame members intermediate said swedged ends are aligned substantially coplanar with the outer surfaces of said second pair of frame members so as to form a frictional interlocking fit between joined frame members and wherein the back portions of each of said frame members are spaced apart from one another at each corner of the rectangular arrangement of said frame members;

(d) moving said shuttle in a first direction to a second position so as to place said first jig section inside a molding press while simultaneously moving said second jig section out of said molding press and into said second work station;

(e) begin a molding process of pressing, heating and gluing the foam material within said first metal frame by said molding press while sequentially assembling a metal frame as in step "c" within said second jig section;

(f) completing said molding process within said molding press so as to form a completed unitary metal framed foam panel;

(g) moving said shuttle in a second direction back to said first position so as to place said first jig section out of said molding press and into said first work station while simultaneously moving said second jig section into said molding press;

(h) begin a molding process of pressing, heating and gluing granulated expandable polystyrene within said metal frame by said molding press while sequentially removing said completed metal framed foam panel from said first jig section of said shuttle, stacking and supporting said completed metal framed foam panel in equidistant spaced apart relationship with other completed panels and assembling a metal frame as in step "c" within said first jig section;

(i) moving said shuttle in said first direction to said second position so as to place said second jig section out of said molding press while simultaneously moving said first jig section into said molding press;

(j) begin a molding process of pressing, heating and gluing granulated expandable polystyrene within said metal frame contained in said first jig section while sequentially removing said completed metal framed foam panel from said second jig section of said shuttle, stacking and supporting said completed metal framed foam panel in equidistant spaced apart relationship with other completed panels and assembling a metal frame as in step "c" within said second jig section.

* * * * *